(12) United States Patent
Bang et al.

(10) Patent No.: US 8,865,362 B2
(45) Date of Patent: Oct. 21, 2014

(54) GASKETS AND BIPOLAR PLATES FOR PEM FUEL CELLS

(75) Inventors: Mads Bang, Skørping (DK); Anders Risum Korsgaard, Aalborg (DK)

(73) Assignee: Serenergy A/S, Hobro (DK)

( * ) Notice: Subject to any disclaimer, the term of this patent is extended or adjusted under 35 U.S.C. 154(b) by 446 days.

(21) Appl. No.: 12/452,703

(22) PCT Filed: Jul. 18, 2008

(86) PCT No.: PCT/DK2008/000272
§ 371 (c)(1),
(2), (4) Date: Feb. 12, 2010

(87) PCT Pub. No.: WO2009/010066
PCT Pub. Date: Jan. 22, 2009

(65) Prior Publication Data
US 2010/0143817 A1    Jun. 10, 2010

(30) Foreign Application Priority Data

Jul. 18, 2007 (DK) .................................. 2007 01064

(51) Int. Cl.
*H01M 8/24* (2006.01)
*H01M 2/38* (2006.01)
*H01M 2/40* (2006.01)
*H01M 8/10* (2006.01)
*H01M 8/02* (2006.01)

(52) U.S. Cl.
CPC .............. *H01M 8/0273* (2013.01); *H01M 8/24* (2013.01); *Y02E 60/50* (2013.01); *H01M 2008/1095* (2013.01); *H01M 8/0258* (2013.01)
USPC ........... 429/457; 429/492; 429/514; 429/490; 429/535

(58) Field of Classification Search
USPC ......... 429/9, 34–35, 38, 17, 19–20, 535, 512, 429/514
See application file for complete search history.

(56) References Cited

U.S. PATENT DOCUMENTS 6,727,012 B2 * 4/2004 Chen et al. .................... 429/411
6,790,552 B2 * 9/2004 Kobayashi et al. ........... 429/469
(Continued)

FOREIGN PATENT DOCUMENTS

CN      2643491        9/2004
CN      1788376 A      6/2006
(Continued)

OTHER PUBLICATIONS

James Larminie and Andrew Dicks, "Hydrogen Fuel Cells", Fuel Cell Systems Explained, Second Edition, pp. 1-24, 2003 John Wiley & Sons, Ltd.

*Primary Examiner* — Ula C. Ruddock
*Assistant Examiner* — Osei Amponsah
(74) *Attorney, Agent, or Firm* — James Creighton Wray (57) ABSTRACT

A bipolar plate (1) in combination with a sealant (50, 70) for a PEM fuel cell, wherein the bipolar plate (1) has an anode side with first flow channels (20) for transport of a proton-donating fuel or a cathode side with second flow channels (12) for transport of proton-accepting fluid, or both, wherein a sealant (50, 70) is provided parallel with the bipolar plate (1) for sealing the bipolar plate against an adjacent electrolytic membrane (40). The sealant (50, 70) has fluid channels (54a, 54b, 74a, 74b) across the sealant (50, 70) for transport of proton-donating fuel or proton-accepting fluid, respectively, across the sealant and along the bipolar plate.

22 Claims, 11 Drawing Sheets

(56) References Cited

U.S. PATENT DOCUMENTS

| | | |
|---|---|---|
| 7,144,648 B2 * | 12/2006 | Tawfik et al. ............... 429/535 |
| 7,425,381 B2 | 9/2008 | Gilman |
| 7,695,846 B2 * | 4/2010 | Sabin et al. ................ 429/457 |
| 2002/0122970 A1 * | 9/2002 | Inoue et al. ................... 429/35 |
| 2003/0059664 A1 | 3/2003 | Menjak et al. |
| 2004/0112740 A1 | 6/2004 | Shen |
| 2004/0131914 A1 * | 7/2004 | Bartholomeyzik et al. ..... 429/34 |
| 2004/0209150 A1 | 10/2004 | Rock |
| 2005/0079400 A1 * | 4/2005 | Sugiura et al. ................ 429/35 |
| 2006/0068263 A1 * | 3/2006 | Kim et al. ..................... 429/35 |
| 2007/0042233 A1 * | 2/2007 | Lyman et al. .................. 429/9 |

FOREIGN PATENT DOCUMENTS

| | | | | |
|---|---|---|---|---|
| EP | 1302996 | 4/2003 | | |
| EP | 1498967 | 1/2005 | | |
| FR | 2891090 A1 | 3/2007 | | |
| GB | 2178223 | 2/1987 | | |
| GB | 2178223 A * | 2/1987 | ............. | H01M 4/86 |
| GB | 2178223 A * | 2/1987 | ............. | H01M 4/86 |
| JP | 2001126746 | 5/2001 | | |
| JP | 2001127746 A | 5/2001 | | |
| JP | 2003100319 A | 4/2003 | | |
| JP | 2006351222 A | 12/2006 | | |
| WO | WO 03/077341 | 9/2003 | | |
| WO | 2004102710 | 11/2004 | | |
| WO | WO 2007/003751 | 1/2007 | | |
| WO | 2007088832 A1 | 8/2007 | | |

\* cited by examiner

GASKETS AND BIPOLAR PLATES FOR PEM FUEL CELLS

This application claims the benefit of Danish Application No. PA 2007 01064 filed Jul. 18, 2007 and PCT/DK2008/000272 filed Jul. 18, 2008, which are hereby incorporated by reference in their entirety.

FIELD OF THE INVENTION

The present invention relates to a bipolar plate for a PEM fuel cell. Furthermore the present invention relates to a sealant for efficient sealing of such a plate in a PEM fuel cell stack.

BACKGROUND OF THE INVENTION

Fuel cells are devices that provides for clean and relative efficient conversion of matter into electrical energy and heat. A range of different technologies have been developed within the last couple of decades, each employing its own principle, type of reactants, optimum operation conditions etc. One technology which has gained particular interest in recent years is the so-called PEM fuel cell.

A PEM (proton exchange membrane) fuel cell comprises an anode and a cathode and a proton exchange membrane interposed there between. The proton exchange membrane comprises a catalyst on the side facing the anode as well as on the side facing the cathode. The principle of a PEM fuel cell is that supplying hydrogen to the side of the membrane facing the anode by virtue of the catalyst on the side of the membrane facing the anode results in the chemical reaction:

Anode reaction: $H_2 \rightarrow 2H^+ + 2e^-$ (1)

The anode is made of an electrically conducting material and thus transports the electrons generated on the anode side of the membrane, whereas the protons generated on the anode side of the PEM-membrane diffused through the membrane.

On the cathode side of the membrane oxygen (or air) is supplied. If an electrical load is connected between the cathode and the anode of the cell so as to form an electrical circuit, the electrons generated at the anode flows through this load to the cathode. The oxygen supplied to the cathode side of the membrane by virtue of the catalyst on the side of the membrane facing the cathode reacts with the protons which have diffused through the membrane and the electrons flowing to the cathode according to the following chemical equation:

Cathode reaction: $O_2 + 4H^+ + 4e^- \rightarrow 2H_2O + heat$ (2)

Hence, the net reaction taking place in a PEM fuel cell is:

$2H_2 + O_2 \rightarrow 2H_2O$ + electrical power + heat (3)

One PEM fuel cell is capable of generating a voltage of 1.23 V. In order to achieve higher voltages for PEM fuel cells, a number of PEM fuel cells are usually connected in series in a so-called PEM fuel cell stack. A fuel cell stack is for the sake of economy often designed in a way that integrates the cathode of one fuel cell with the anode of an adjacent fuel cell of the corresponding stack. This is achieved by employing so-called bipolar plates. A bipolar plate is a plate which has two sides, one of which functions as an anode for one fuel cell, and the other of which functions as a cathode for the adjacent fuel cell in the corresponding fuel cell stack.

A PEM fuel cell is quite sensitive in the sense that it is important that the hydrogen supplied to the anode is not contaminated with other gases. Furthermore, due the heat generated on the cathode side, it is important that this side is cooled in order for the fuel cell stack to remain within the temperature limits which provide for optimum performance. A fuel cell stack may be cooled by supplying to the cathode side of each cell more oxygen (or air) than is needed relative to the amount of hydrogen supplied on the anode side of each cell. Another principle of cooling is the implementation of a coolant circuit in the stack.

On the basis of the above considerations much research and development of PEM fuel cells has in the recent years focused on the specific physical design of the fuel cell and in particularly on the physical design of the bipolar plates.

US patent application No. 2003/0059664 discloses bipolar plates in a stack formation, where the bipolar plate is sandwiched between an oxygen and a hydrogen electrode adjacent to the electrolyte chambers separated by the bipolar plate. The electrodes are formed with channels in a grid like fashion, making the formation production-wise complicated and expensive.

A more simple stack formation is disclosed in International patent application WO 2007/003751 as a prior art example, where the bipolar plates are sealed against the electrode by elastomeric sealants formed as square o-rings. These o-rings do not allow oxygen or hydrogen passing by, such that a different, improved system is proposed, which however has a production-wise complicated configuration.

WO 03/077341 discloses a bipolar stack formation with bipolar plates having channels running from edge to edge of the bipolar plate. The channels are sealed against the electrolyte by a plate of fibrous composite material. In order to achieve a gas tight arrangement, the dimensional tolerances for the fibrous plate are narrow, which production-wise is complicated.

Accordingly numerous different designs of bipolar plates have been disclosed in the art. However, although a substantial amount of these designs fulfil the technical requirements for such plates, they all suffer from the disadvantage that the have a structure which is quite complicated and therefore their manufacture is costly. This is in particular the case in situations wherein in addition to the dipolar plates, also cooling plates are included in the fuel cell stack.

OBJECT OF THE INVENTION

It is an object of the present invention to provide a bipolar plate for a PEM fuel cell which overcomes the above disadvantage and a sealant which is suitable for use with such a bipolar plate according to the present invention.

DESCRIPTION OF THE INVENTION

This object is achieved with a bipolar plate in combination with a sealant, wherein the bipolar plate has an anode side with first channels for transport of a proton-donating fuel or a cathode side with second channels for transport of proton-accepting fluid, or both, wherein a sealant, preferably an elastomeric sealant, is provided parallel with the bipolar plate for sealing the bipolar plate against an adjacent electrolytic membrane, characterised in that the sealant has secondary fluid channels across the sealant for transport of proton-donating fuel or proton-accepting fluid, respectively, across the sealant and along the bipolar plate.

By providing a sealant, for example much in the form of an o-ring, in which channels are provided, gas tight sealing is achieved around the entrances or exits of the fuel channels or fluid channels in a simple manner. Thus, no difficult production process with narrow tolerances is required, which makes the production easy and minimizes production costs. The fluid channels can be provided as cut-outs, where the term cut-outs does not necessarily imply that the channels are truly cut out, but where the appearance is like cut-outs. A preferred production method is moulding of an elastomeric sealant, where the sealant is moulded between two mould parts, where one mould part has a corrugated region. The corrugation of the moulded sealant provides the fluid channels for entrance or exit of the fluid, typically hydrogen gas and air, respectively.

In a preferred embodiment, the first channels or the second channels or both are surrounded by the sealant. In other words, the sealant confines the channels, for example by extending along an edge side of the bipolar plate. For holding the sealant in place, the bipolar plate can be provided with a groove, for example in the form a shallow recess or in the form of a deep furrow.

Optionally—but not necessarily—used in a combination as described above may be an inventive bipolar plate for a PEM fuel cell, said bipolar plate having a anode side and a cathode side; wherein
a) said plate having a penetrating inlet hole defining a flow channel for hydrogen gas entering the fuel cell; and said plate having a penetrating outlet hole defining a flow channel for hydrogen gas exiting the fuel cell; and
b1) said cathode side having one edge section comprising one or more grooves defining inlet channels for oxidant gas; and said cathode side having another edge section comprising one or more grooves defining outlet channels for oxidant gas; wherein the inlet channel grooves as well as the outlet channel grooves extend to the edge of the respective edge section; and wherein said cathode side having one or more grooves defining flow channels for oxidant gas and connecting inlet channel(s) for oxidant gas with outlet channel(s) for oxidant gas;
and/or
b2) said anode side having an inlet channel for hydrogen gas in the form of one or more grooves extending from the inside of the inlet hole; and said anode side having an outlet channel for hydrogen gas in the form of one or more grooves extending from the inside of the outlet hole; and said anode side having one or more grooves defining flow channels for hydrogen; said grooves providing fluid connection of hydrogen gas from the inlet hole for hydrogen gas to the outlet hole for hydrogen gas; and wherein
c) either the anode side or the cathode side or both sides of the plate comprises: a sealant groove for taking op a seal, said sealant groove extends alongside the edges of the plate so as to be able to take up a sealant for efficiently avoiding escape of gas except via the channels intended therefore as defined above; said sealant groove if present on the cathode side intersects the inlet channel grooves for oxidant gas as well as the outlet channel grooves for oxidant gas; and said sealant groove if present on the anode side intersects the flow path of hydrogen entering via the inlet channel for hydrogen gas defined by grooves; and said sealant groove if present on the anode side intersects the flow path of hydrogen gas exiting via the outlet channel defined by grooves.

The present invention relates also to a method for the manufacture of the bipolar plate according to the present invention.

The following describes a sealant for sealing the cathode side of the bipolar plate as described above. The sealant is adapted to fit into the sealant groove of said cathode side of said bipolar plate; wherein said sealant in the part adapted to fit into the part of the sealant groove which extends alongside the specific edge sections comprising the inlet channel groove for oxidant gas and the outlet channel groove for oxidant gas respectively, comprises one or more cut-aways for allowing oxidant gas to pass the sealant via the respective inlet and outlet channels for oxidant gas.

In a further aspect, the present invention relates to a sealant for sealing the anode side of the bipolar plate as described above. The sealant is adapted to fit into the sealant groove of said anode side of said bipolar plate; wherein:
said sealant in the part adapted to fit into the sealant groove which intersects the flow path for hydrogen gas connecting the inlet channel grooves and the grooves comprises one or more cut-aways for allowing hydrogen gas to pass the sealant via said grooves defining the inlet channel for hydrogen gas; and wherein
said sealant in the part adapted to fit into the sealant groove which intersects the flow path for hydrogen gas connecting the outlet channel grooves and the grooves comprises one or more cut-aways for allowing hydrogen gas to pass the sealant via said grooves defining the outlet channel for hydrogen gas.

In a further aspect the present invention relates to a process for the manufacture of a selant according to the present invention.

In a further aspect the present invention relates to a PEM fuel cell stack 90 comprising more than one bipolar plate and one or more sealants.

A further aspect of the present invention relates to a PEM fuel cell stack system. The PEM fuel cell stack system according to the present invention comprising a fuel cell stack, wherein the PEM fuel cell stack is enclosed in a container in such a way that two separate rooms are formed within said container, the first room is located at the specific side of the fuel cell stack which comprises the edge sections of each fuel cell comprising the inlet channels for oxygen; the other room is located on the specific side of the fuel cell stack which comprises the edge sections of each fuel cell comprising the outlet channels for oxygen; said separate rooms thereby defining an inlet manifold for oxygen and an outlet manifold for oxygen.

In a further aspect, the present invention relates to a method for the production of electric power and/or heat using a PEM fuel cell stack or by use of a using a PEM fuel cell stack system.

In a further aspect, the present invention relates to use of a PEM fuel cell stack according to the present invention or use of a PEM fuel cell stack system according to the present invention as a back-up power system.

In a further aspect, the present invention relates to a use of PEM fuel cell stack according to the present invention or use of a PEM fuel cell stack system according to the present invention as continuous power generation system.

DETAILED DESCRIPTION OF THE INVENTION

The Bipolar Plate

In a certain aspect the present invention provides a bipolar plate for use in a PEM fuel cell stack. The bipolar plate according to the present invention owing to its simple design is very easy to produce and thus can be manufactured at low cost.

Figure 1:
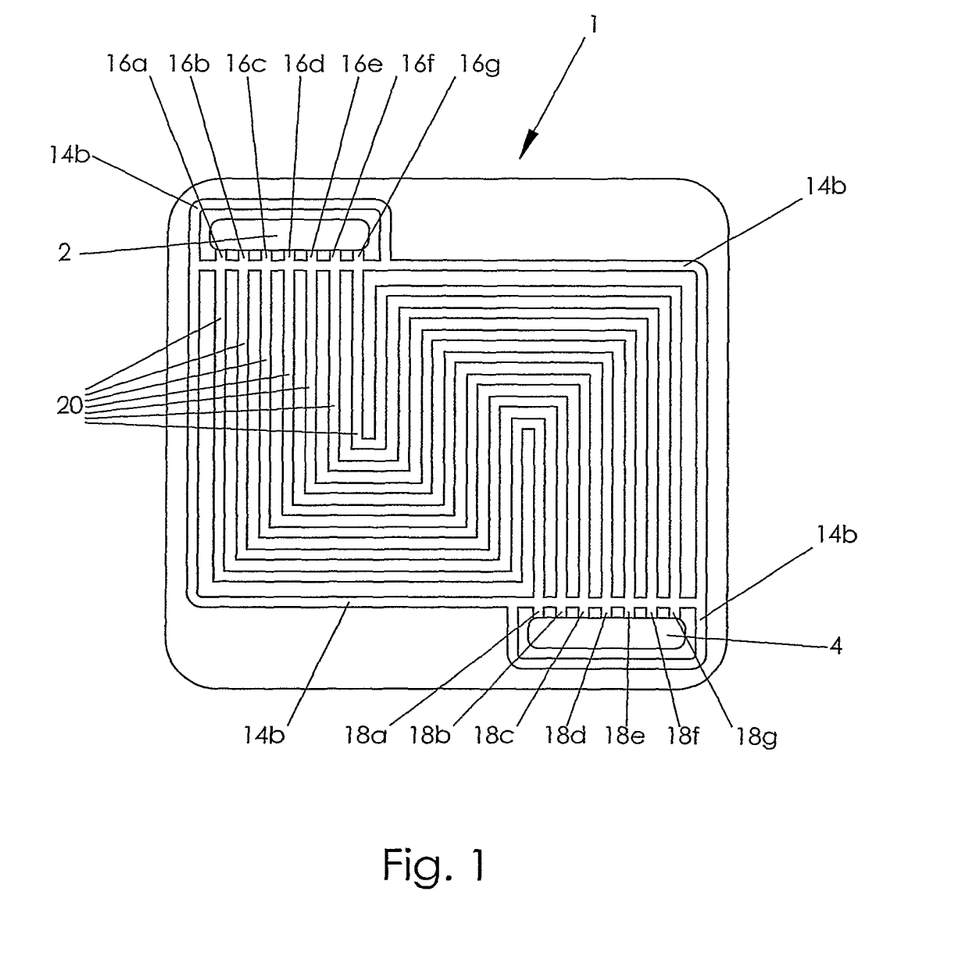
FIG. 1 is a plan view showing the anode side of a bipolar plate according to the present invention.
Figure 2:
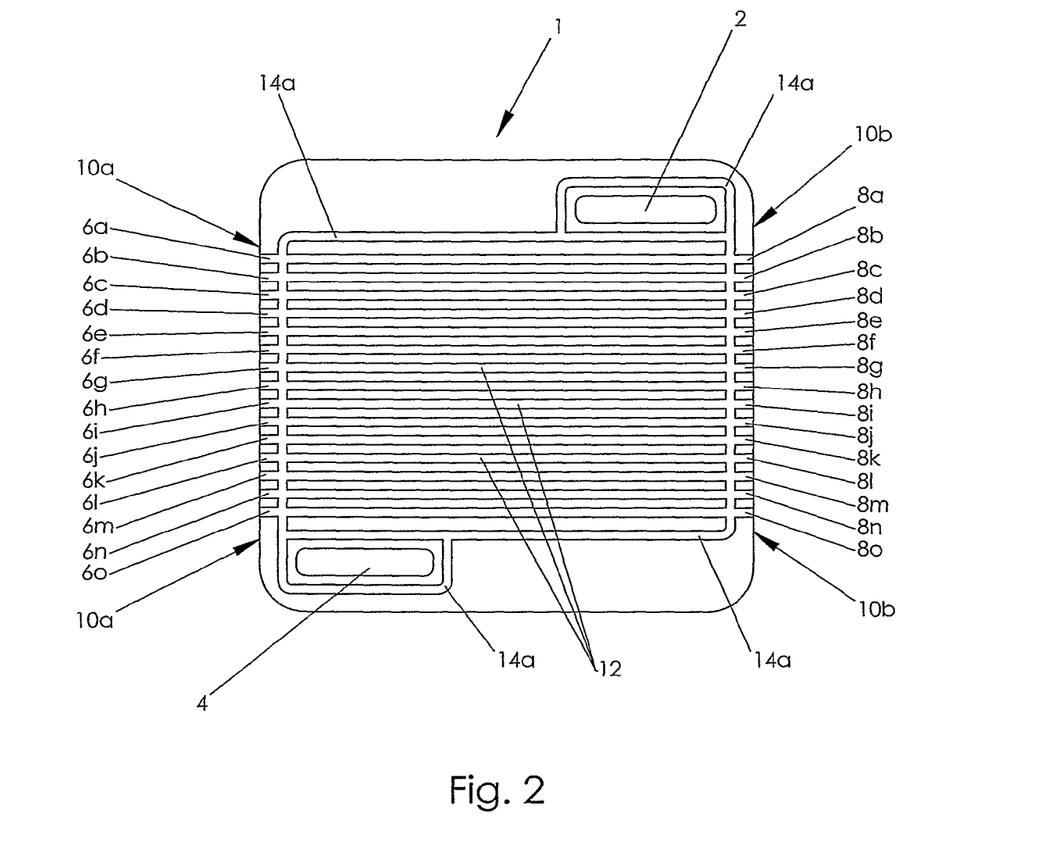
FIG. 2 is a plan view showing the cathode side of a bipolar plate according to the present invention.

The bipolar plate according to the present invention has two sides; viz. one side, as illustrated in FIG. 1, designed to function as an anode and another side, as illustrated in FIG. 2, designed to function as a cathode. The bipolar plate according to the present invention furthermore a penetrating inlet hole 2 defining a flow channel for hydrogen gas entering the fuel cell as well as an outlet hole 4 defining a flow channel for hydrogen gas exiting the fuel cell.

When stacked together in a PEM fuel cell stack several bipolar plates according to the present invention are arranges in such a way that the inlet hole for hydrogen gas of each plate is located exactly in the same position in respect of each other. In this way, the inlet hole of each bipolar plate of the stack defines a flow channel for hydrogen gas entering the fuel cell stack. In addition, the outlet hole for hydrogen gas of each plate is located exactly in the same position in respect of each other. In this way, the outlet hole of each bipolar plate of the stack defines a flow channel for hydrogen gas exiting the fuel cell stack.

The bipolar plate according to the present invention preferably has four edge sections and preferably has a geometry in which adjacent edge sections are essentially perpendicular to each other. In such a design, it is preferred to arrange the inlet hole for hydrogen 2 and the outlet hole for hydrogen 4 in essentially opposite corners of the plate FIGS. 1 and 2 show this arrangement. Alternatively these holes 2 and 4 can be arranges near adjacent corners so as to be arranged on the same edge section.

The Cathode Side of the Bipolar Plate of the Fuel Cell

The cathode side of the bipolar plate 1, as illustrated in FIG. 2, comprises two edge sections 10a, 10b. One edge section 10a comprises one or more grooves 6 defining inlet channels for oxidant gas. Another edge section 10b comprises one or more grooves 8 defining outlet channels for oxidant gas. The groves 6 and 8 extends all the way to the edge of each edge section 10a, 10b respectively. In this way openings in the edge of the bipolar plate are provided which serves as channels for introduction of oxygen to and exhaustion of oxygen and water vapour from the reactive sites on the cathode side of the bipolar plate.

The inlet channels defined by grooves 6 and the outlet channels defined by grooves 8 are in fluid connection via grooves 12 so as to provide for a flow of oxygen from the inlet channel grooves 6 via the grooves 12 to the reactive section of the cathode side of the bipolar plate and out of the bipolar plate via the outlet channel grooves 8. The specific geometry of grooves 12 connecting inlet channel grooves 6 with outlet channel grooves 8 is not critical and is entirely optional. However, it is preferred that the channels 12 have a geometry which ensures an efficient supply of oxygen to an area of the cathode side of the bipolar plate, and thereby to the corresponding active sites of the corresponding membrane, which is as large as possible.

The bipolar plate according to the present invention comprises on the cathode side and alongside the edges of the plate a sealant groove 14a which is provided for taking up a seal. This is illustrated in an exploded view in FIGS. 6 and 7. When stacked together in a fuel cell stack, the sealant located in the sealant groove 14a ensures that no oxygen or oxygen/water vapour gasses escapes the cathode side of the fuel cell stacks except via the channels intended there for as described above.

The sealant groove 14a surrounds on the cathode side the inlet hole for hydrogen 2 as well as outlet hole for hydrogen 4. When a sealant surrounds the inlet hole for hydrogen 2 as well as the outlet hole for hydrogen 4 it is ensured that no hydrogen originating from either the inlet hole 2 or outlet hole 4 for hydrogen will leak into the cathode side of the bipolar plate of the fuel cell stack.

At the edge section 10a and 10b the sealant groove 14a intersects the inlet channel grooves 6 for oxygen as well as the outlet channel grooves 8 for oxygen. However, as disclosed below in the section relating to the sealant per se, the sealant in the locations corresponding to the edge sections 10a and 10b has a number of cut-aways that allow for passage of oxygen.

The number of inlet channel grooves 6 is entirely optional. However, it is preferred that the number of inlet channel grooves is: 2-20, such as 4-18, e.g. 5-15, such as 7-14, for example 8-12, preferably 9, 10 or 11.

The number of outlet channel grooves 8 is entirely optional. However, it is preferred that the number of inlet channel grooves is: 2-30, such as 4-28, e.g. 5-25, such as 7-24, for example 8-22, such as 10-10, such as 12-18, preferably 13, 14, 15, 26 or 17.

In the preferred embodiment in which the bipolar plate according to the present invention has four edge sections and has a geometry in which adjacent edge sections essentially are perpendicular to each other it is preferred that the edge section 10a comprising the inlet channels grooves 6 is arranged opposite to the edge section 10b comprising the outlet channels grooves 8. Such a preferred design is shown in FIG. 2. However, the edge sections 10a and 10b may in another embodiment be adjacent edge sections.

FIG. 2 shows a plan view of the cathode side of a bipolar plate according to the present invention. FIG. 2 shows the bipolar plate 1 comprising an inlet hole 2 for hydrogen and an outlet hole 4 for hydrogen. Furthermore the bipolar plate on its cathode side comprises inlet channels for oxygen in the form of grooves 6a-6o which extend from the edge of the edge section 10a. Additionally, the cathode side furthermore comprises outlet channels for oxygen in the form of grooves 8a-8o which extend from the edge of the edge section 10b. FIG. 2 also shows that grooves 6a-6o are connected to grooves 8a-8o via flow channels 12. Finally, FIG. 2 shows the sealant groove 14a of the cathode side of the bipolar plate according to the present invention. Sealant groove 14a surrounds all other grooves (except outer portion of grooves 6a-6o and 8a-8o) of the anode side thus efficiently providing for efficient avoidance of leaks of gas.

Figure 11A:
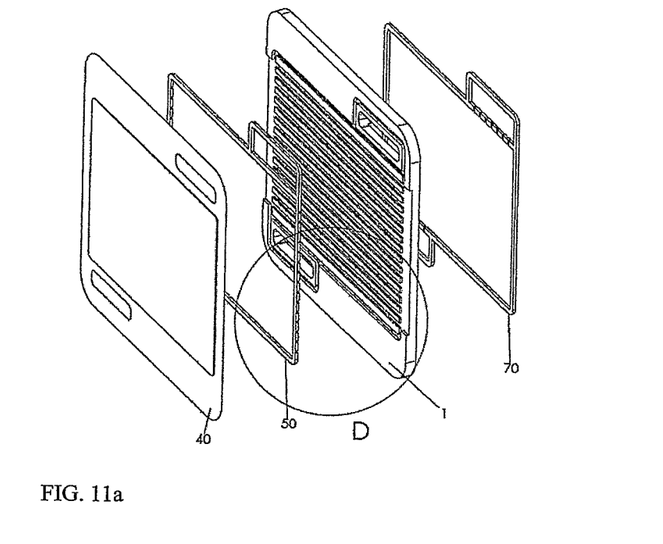
FIG. 11 shows an alternative embodiment of a bipolar plate as seen from the cathode side.
Figure 11B:
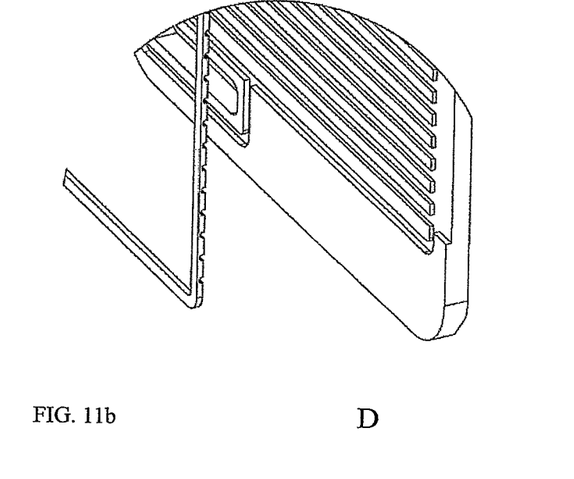

Alternatively, as illustrated in FIG. 11a with an enlarged cut-out region in FIG. 11b, the inlet channels and outlet channels for oxygen can solely be formed by the sealant 50. Strictly, the grooves 6a-6o and 8a-8o are not necessary, which production-wise is an advantageous.

The Anode Side of the Bipolar Plate of the Fuel Cell

The anode side of the fuel cell, as illustrated in FIG. 1, comprises inlet channels 16 for hydrogen gas in the form of one or more grooves 16 which extend from the inside of the inlet hole 2 for hydrogen. In analogy, the anode side furthermore comprises outlet channels in the form of one or more grooves 18 which extend from the inside of the outlet hole 4 for hydrogen.

In addition, the anode side of the bipolar plate according to the present invention comprises flow channels 20 for hydrogen. The flow channels for hydrogen provides for efficient distribution of the hydrogen supplied to the anode side of the fuel cell, and thereby efficient distribution of the hydrogen supplied to the corresponding active sites on the anode side of the membrane. The flow channels 20 connect the inlet grooves 16 with the outlet grooves 18.

The specific geometry of grooves 20 connecting inlet channel grooves 16 with outlet channel grooves 18 is not critical and is entirely optional. However, it is preferred that the channels 20 have a geometry which ensures an efficient supply of hydrogen to an area of the cathode side of the bipolar plate, and thereby to the corresponding active sites of the anode side of the corresponding membrane, which is as large as possible.

The grooves for hydrogen 16,20,18 allow hydrogen to flow from inlet hole 2 for hydrogen via grooves 16 and flow channels 20 for hydrogen to outlet hole 4 for hydrogen via grooves 18.

Figure 6:
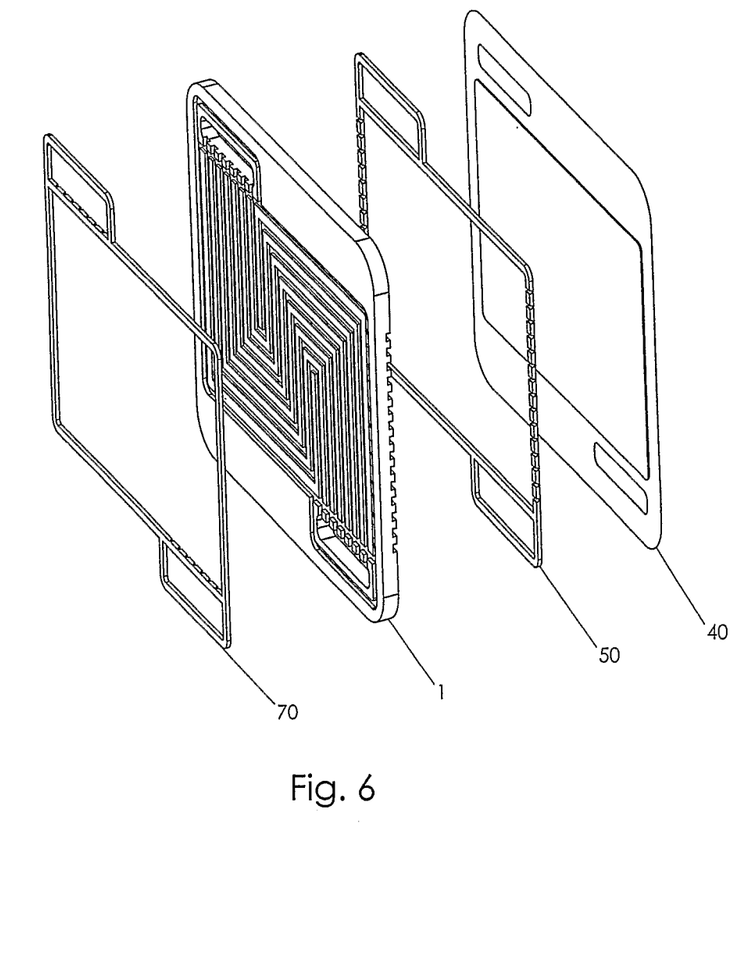
FIG. 6 is a perspective view seen from the anode side of one "sandwich element" comprising (from left to right): a sealant for sealing off the anode side of a PEM bipolar plate; a PEM bipolar plate; a sealant for sealing off the cathode side of a PEM bipolar plate; and finally a membrane.
Figure 7:
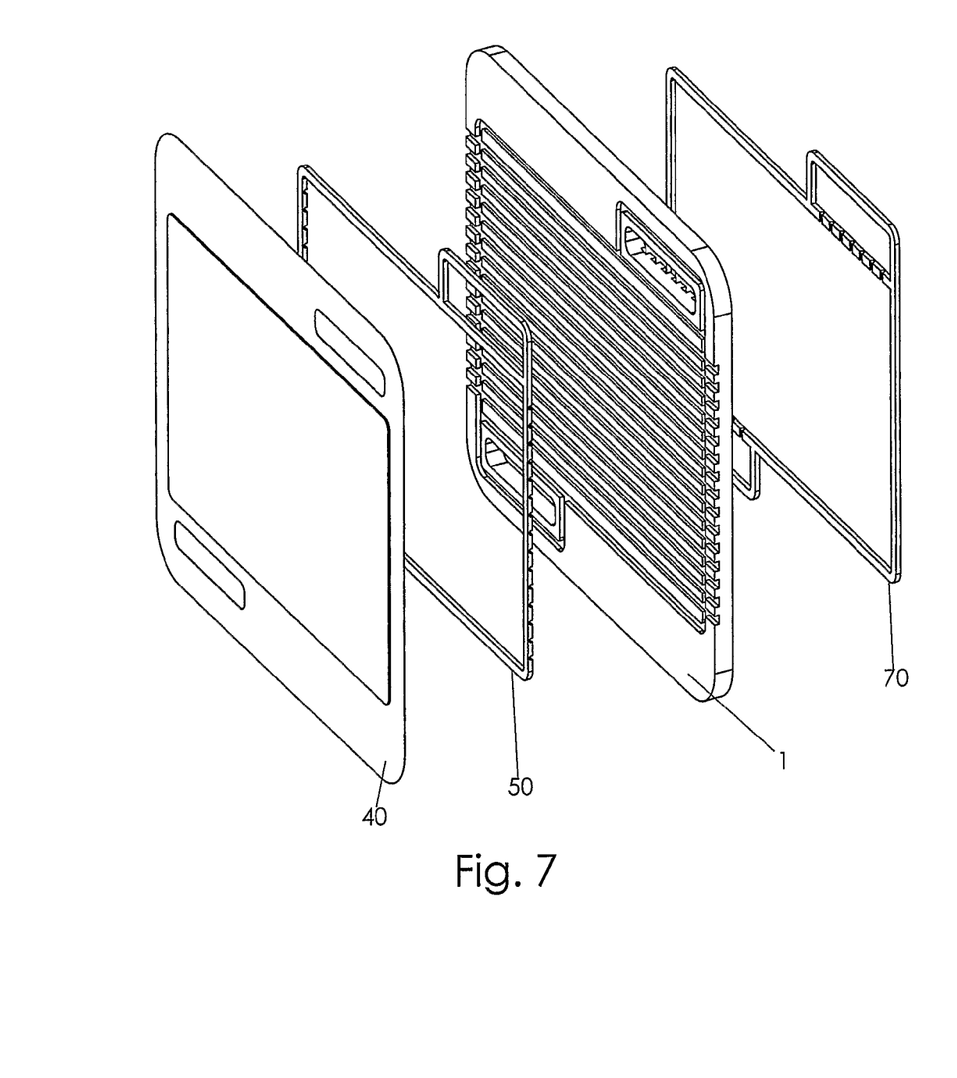
FIG. 7 is a perspective view seen from the cathode side of one "sandwich element" comprising (from left to right): a membrane; a sealant for sealing off the cathode side of a PEM bipolar plate; a PEM bipolar plate; and finally a sealant for sealing off the anode side of a PEM bipolar plate.

The bipolar plate according to the present invention comprises on the anode side and alongside the edges of the plate a sealant groove 14b which is provided for taking up a seal. This is illustrated in FIGS. 6 and 7. When stacked together in a fuel cell stack, the sealant located in the sealant groove 14b ensures that no hydrogen or escapes the anode side of the fuel cell stacks except via the channels intended there for as described above.

Tests have shown that if the geometry of the sealant on the cathode side mirrors the geometry of the sealant on the anode side in the sense that the seals are arranged so that they eclipse each other when viewed in a direction perpendicular to the surface of the plate, an optimum quality of sealing properties is achieved. Due to the fact that the cathode side of the plate must comprise sealant grooves which surround the inlet hole for hydrogen 2 and the outlet hole for hydrogen 4 respectively, it is preferred that also the anode side of the bipolar plate according to the present invention comprises a sealant groove surrounding the inlet hole 2 for hydrogen and the outlet hole 4 for hydrogen respectively.

The provision of a sealant groove on the anode side of the bipolar plate and surrounding the inlet hole 2 for hydrogen has the consequence that the sealant groove 14b intersects the flow of hydrogen entering the anode side of the bipolar plate from inlet hole 2 to flow channels 20 via inlet channel grooves 16. In analogy, the provision of a sealant groove on the anode side of the bipolar plate and surrounding the outlet hole 4 for hydrogen has the consequence that the sealant groove 14b intersects the flow of hydrogen exiting the anode side of the bipolar plate from the flow channels 20 to the outlet hole 2 to via outlet channel grooves 16.

As disclosed below in the section relation to the sealant per se, the sealant in the locations corresponding to the intersection of the flow path of hydrogen and the sealant groove 14b has a number of cut-aways that allow for passage of hydrogen.

The number of inlet channel grooves 16 and outlet channel grooves 18 respectively is entirely optional and will depend on the dimensions of the bipolar plate. However, it is preferred that the number of inlet channel grooves 16 and outlet channel grooves 18 respectively independently is: 1-10, such as 2-9, for example 3-8, such as 4-7, e.g. 5 or 6.

FIG. 1 shows a plan view of the anode side of a bipolar plate according to the present invention. FIG. 1 shows the bipolar plate 1 comprising an inlet hole 2 for hydrogen and an outlet hole 4 for hydrogen. Furthermore the bipolar plate on its anode side comprises inlet channels for hydrogen gas in the form of grooves 16a-16g which extend from the inside of the inlet hole 2 for hydrogen. Additionally, the anode side furthermore comprises outlet channels in the form of grooves 18a-18g which extend from the inside of the outlet hole 4 for hydrogen. FIG. 1 also shows that grooves 16a-16g are connected to grooves 18a-18g via flow channels 20. Finally, FIG. 1 shows the sealant groove 14b of the anode side of the bipolar plate according to the present invention. Sealant groove 14b surrounds all other grooves of the anode side thus efficiently providing for efficient avoidance of leaks of gas.

Figure 10:
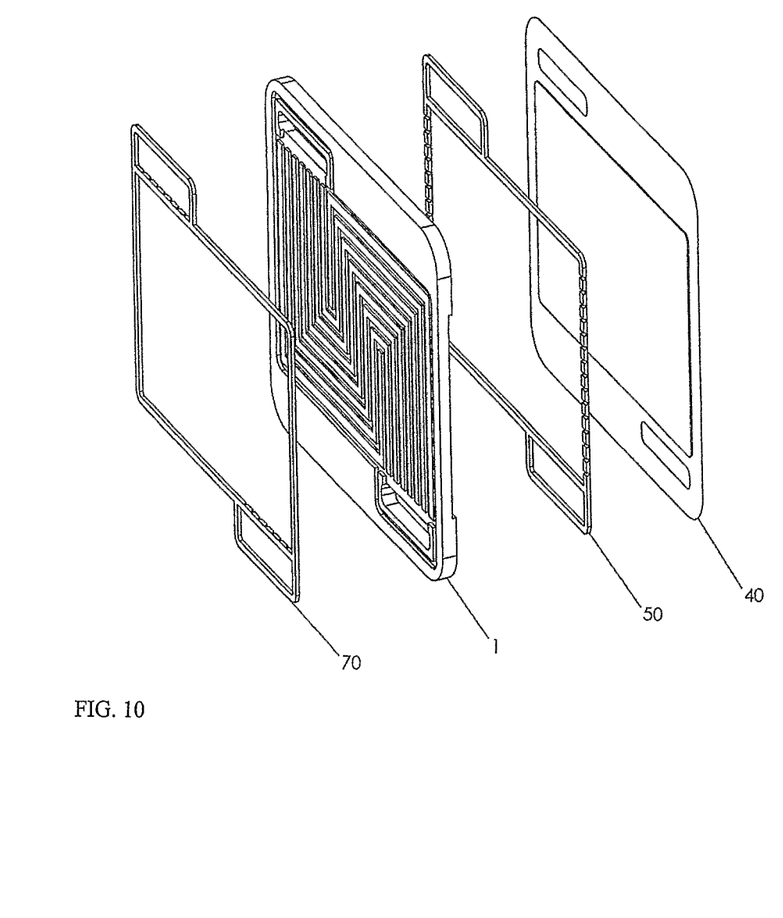
FIG. 10 shows an alternative embodiment of a bipolar plate as seen from the anode side.

Alternatively, as illustrated in FIG. 10, the inlet channels for hydrogen can solely be formed by the sealant 70. Strictly, the grooves 16a-16o and 18a-18o are not necessary, which production-wise is an advantageous.

In one embodiment of the bipolar plate according to the present invention, the bipolar plate only comprises the features described above in respect of the anode side.

In another embodiment of the bipolar plate according to the present invention, the bipolar plate only comprises the features described above in respect of the cathode side.

In yet another embodiment of the bipolar plate according to the present invention, the bipolar plate comprises the features described above in respect of the cathode side as well as in respect of the anode side.

The Manufacture of a Bipolar Plate According to the Present Invention

The present invention in second aspect relates to a method for the manufacture of the bipolar plate according to the present invention.

The bipolar plate according to the present invention may be of any suitable material. It is an essential feature that the material of the bipolar plate is electrical conductive and that it is corrosive resistant. A suitable material may be selected from the group comprising: graphite; graphite powder comprising a binder; a metal; a metal comprising a corrosion resistant coating; an alloy; an alloy comprising a corrosion resistant coating; an electrically conducting elastomeric compound; and an electrically conductive ceramic material.

The bipolar plate according to the present invention may be manufactured by techniques known to be conventional in the art. In a preferred embodiment according to the method for the preparation of a bipolar plate according to the present invention, the bipolar plate is produced by the following steps:

i) provision of a material having dimensions which at least corresponding to the desired design of the bipolar plate;

ii) provision of the details of the desired design by milling off excessive material, e.g. in a CNC milling machine;
iii) optionally coating the plate with a corrosion resistant coating.

In another preferred embodiment according to the method for the preparation of a bipolar plate according to the present invention, the bipolar plate is produced by the following steps:
i) provision of a material suitable for moulding and/or casting;
ii) casting the material into the desired design of the bipolar plate;
iii) optionally coating the plate with a corrosion resistant coating.

Figure 4:
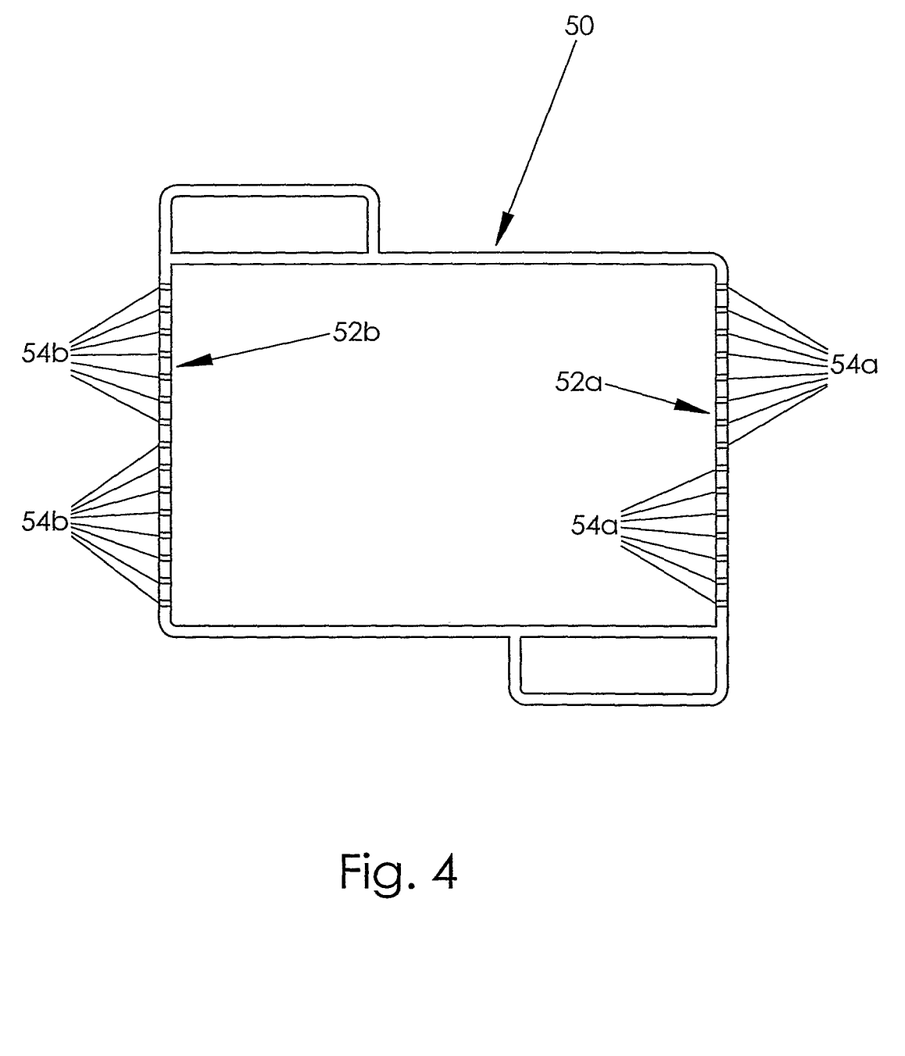
FIG. 4 is plan view showing a sealant for sealing off the cathode side of a bipolar plate according to the present invention.

A Sealant for Sealing the Cathode Side or the Anode Side of the Bipolar Plate According to the Present Invention and the Process for its Manufacture In a third aspect the present invention relates to a sealant for sealing the cathode side of the bipolar plate according to the present invention. The sealant is adapted to fit into the sealant groove 14a of said cathode side of said bipolar plate in order to efficiently seal the flow channels represented by the grooves in the cathode side of the bipolar plate. The sealant in the part 52a,52b which is adapted to fit into the part of the sealant groove which extends alongside the specific edge sections 10a,10b comprising the inlet channel groove for oxidant gas and the outlet channel groove for oxidant gas respectively, comprises one or more cut-aways 54a,54b for allowing oxidant gas to pass the sealant via the respective inlet and outlet channels for oxidant gas.

In a preferred embodiment of the sealant for sealing the cathode side of the bipolar plate according to the present invention, the number of cutaways 54a,54b respectively in the sealant corresponds to the number of grooves 6 defining inlet channels for oxidant gas; and grooves 8 defining outlet channels for oxidant gas respectively.

FIG. 4 shows a plan view of a sealant according to the present invention for sealing the cathode side of the bipolar plate according to the present invention. FIG. 4 shows the sealant 50 comprising sealant material in a form that allows for perfect adaptation into the sealant groove 14a of the cathode side of the bipolar plate of FIG. 2. The sealant in FIG. 4 comprises cut-away-channels 54a and 54b in the edge sections 52a and 52b respectively. These cut-aways provides for passage of oxidant gas in and out of the fuel cell.

Figure 3:
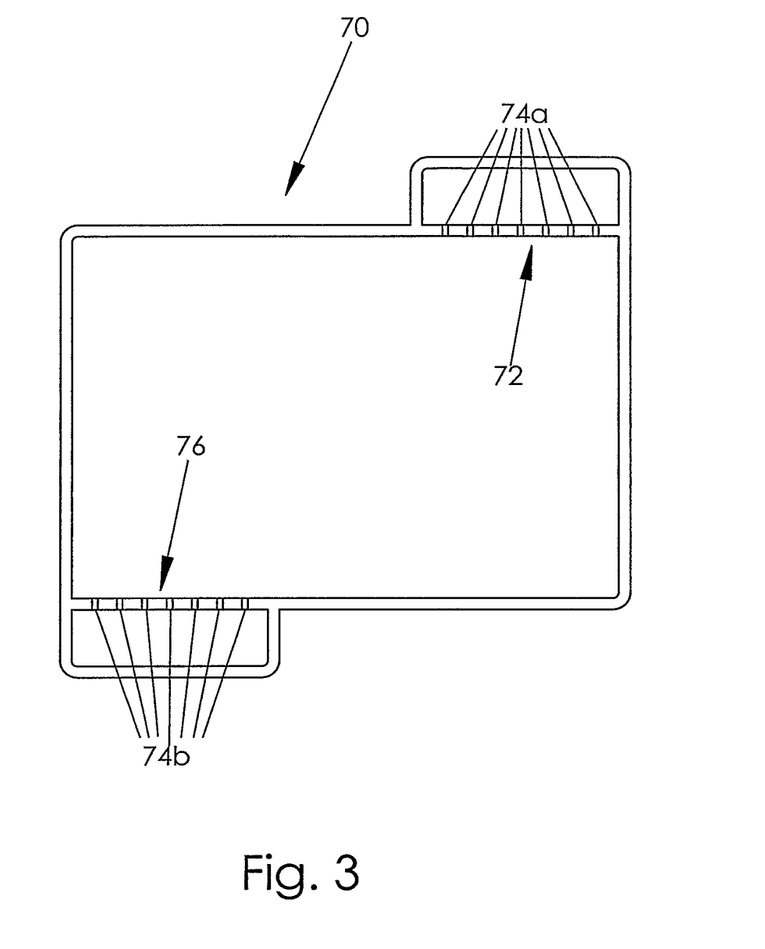
FIG. 3 is plan view showing a sealant for sealing off the anode side of a bipolar plate according to the present invention.

In a fourth aspect the present invention relates to a sealant for sealing the anode side of the bipolar plate according to the present invention. The sealant is adapted to fit into the sealant groove 14b of said anode side of said bipolar plate in order to efficiently seal the flow channels represented by the grooves in the anode side of the bipolar plate.

The anode side sealant in the part 72 adapted to fit into the sealant groove which intersects the flow path for hydrogen gas connecting the inlet channel grooves 16 and the grooves 20 comprises one or more cut-aways 74a for allowing hydrogen gas to pass the sealant via said grooves defining the inlet channel for hydrogen gas. Furthermore, the anode side sealant in the part 76 adapted to fit into the sealant groove which intersects the flow path for hydrogen gas connecting the outlet channel grooves 18 and the grooves 20 comprises one or more cut-aways 74b for allowing hydrogen gas to pass the sealant via said grooves defining the outlet channel for hydrogen gas.

In a preferred embodiment of the sealant for sealing the cathode side of the bipolar plate according to the present invention, the number of cutaways 74a,74b in the sealant corresponds to the number of grooves 16 defining inlet channels for hydrogen gas; and grooves 18 defining outlet channels for hydrogen respectively.

FIG. 3 shows a plan view of a sealant according to the present invention for sealing the anode side of the bipolar plate according to the present invention. FIG. 3 shows the sealant 70 comprising sealant material in a form that allows for perfect adaptation into the sealant groove 14b of the anode side of the bipolar plate of FIG. 1. The sealant in FIG. 3 comprises cut-away-channels 74a and 74b in the sections 72 and 76 respectively. These cut-aways provides for passage of hydrogen gas in and out of the fuel cell.

The sealant according to the present invention—whether it is intended for the anode side or the cathode side of the bipolar plate according to the present invention may be of any suitable material. A preferred material for such a sealant is a material selected from the group comprising: elastomers, such as hydrocarbon rubbers, substituted hydrocarbon rubbers, such as fluoro-hydrocarbon rubbers; or silicon rubbers. It is preferred that the sealant material is highly corrosion resistant and/or highly capable of withstanding penetration of hydrogen. The term "highly" in this context means that the material has the above desired properties even after prolonged exposure, such as exposure for several months or years, under the conditions encountered during operation of the fuel cell stack In a fifth aspect the present invention relates to a process for the manufacture of a sealant according to the present invention. The sealant according to the present invention is manufactured in a manner known per se in the art of elastomer engineering. Preferably, the sealant material is manufactured by moulding the sealant material into ,he desired design of the sealant.

The Proton Exchange Membrane

Figure 5:
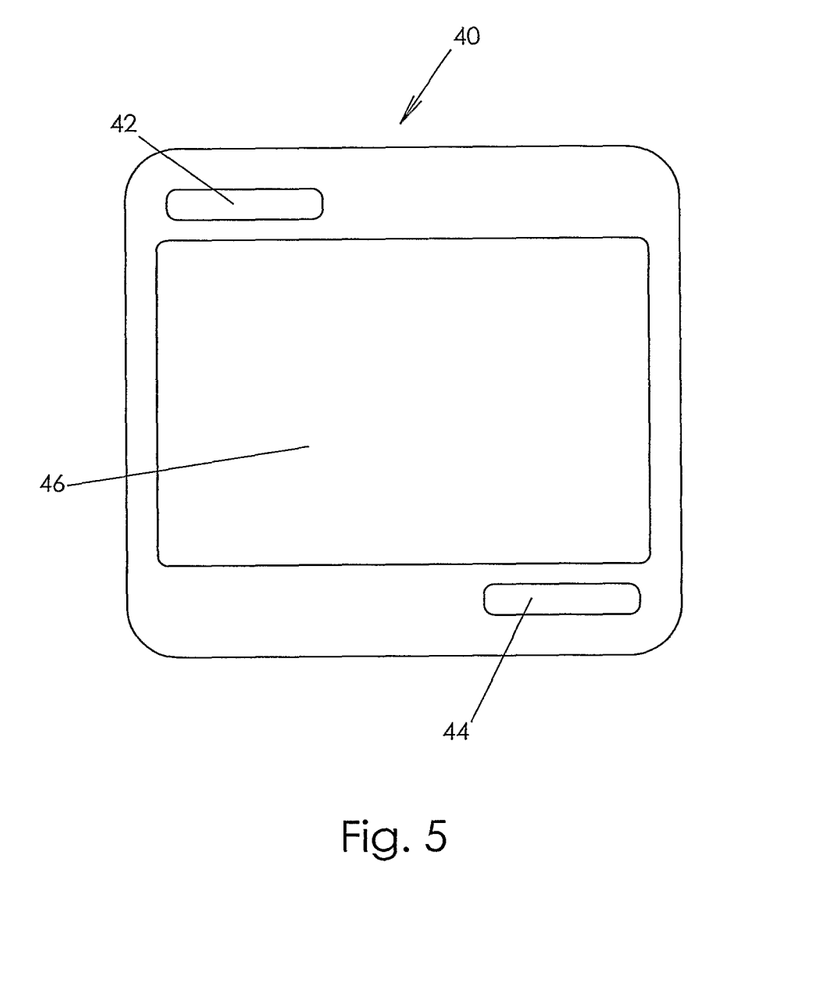
FIG. 5 shows a plan view of a membrane for interposition between the bipolar plates according to the present invention.

For the sake of completeness and referring to FIG. 5, information is provided regarding to proton exchange membrane to be used with the bipolar plate according to the present invention. The proton exchange membrane may be made of any suitable material conventionally used with such membranes. A person skilled in the art will know of suitable materials for use as proton exchange membrane. The membrane comprises on one side a catalyst for catalysing the anode reaction and on the other side a catalyst for catalysing the cathode reaction. The catalysts used may be of any conventional type. A person skilled in the art will know of suitable materials for use as catalyst on the anode and on the cathode side of the membrane. It is preferred that the proton exchange membrane has dimensions corresponding to the dimensions of the surface of the bipolar plate according to the present invention. Furthermore it is preferred that the proton exchange membrane comprising holes allowing the passage of hydrogen entering/exiting the fuel cell.

FIG. 5 shows a proton exchange membrane 40 comprising a catalyst material 46. The proton exchange membrane 40 has dimensions corresponding to the dimensions of the surface of the proton exchange membrane according to the present invention. Furthermore, the proton exchange membrane 40 comprises holes 42 and 44 allowing the passage of hydrogen entering/exiting the fuel cell.

The PEM Fuel Cell Stack According to the Present Invention

In a sixth aspect the present invention relates to a PEM fuel cell stack 90 comprising more than one bipolar plate according to the present invention and one or more sealants according to the present invention.

FIG. 6 shows in a perspective view seen from the anode side one "sandwich element" comprising (from left to right): a sealant 70 for sealing off the anode side of a PEM bipolar plate; a PEM bipolar plate 1; a sealant 50 for sealing off the cathode side of a PEM bipolar plate; and finally a membrane 40.

Likewise, FIG. 7 shows in a perspective view seen from the cathode side one "sandwich element" comprising (from left to right): a membrane 40; a sealant 50 for sealing off the cathode side of a PEM bipolar plate; a PEM bipolar plate 1; and finally a sealant 70 for sealing off the anode side of a PEM bipolar plate.

The PEM fuel cell stack according to the present invention comprises two or more repeating sandwich units as depicted in FIG. 6 and/or 7. The ends of the stack are terminated with an end plate. The design of the endplate follows conventions in the prior art and it is within the ability of a person skilled in the art to provide such end plates.

Figure 8:
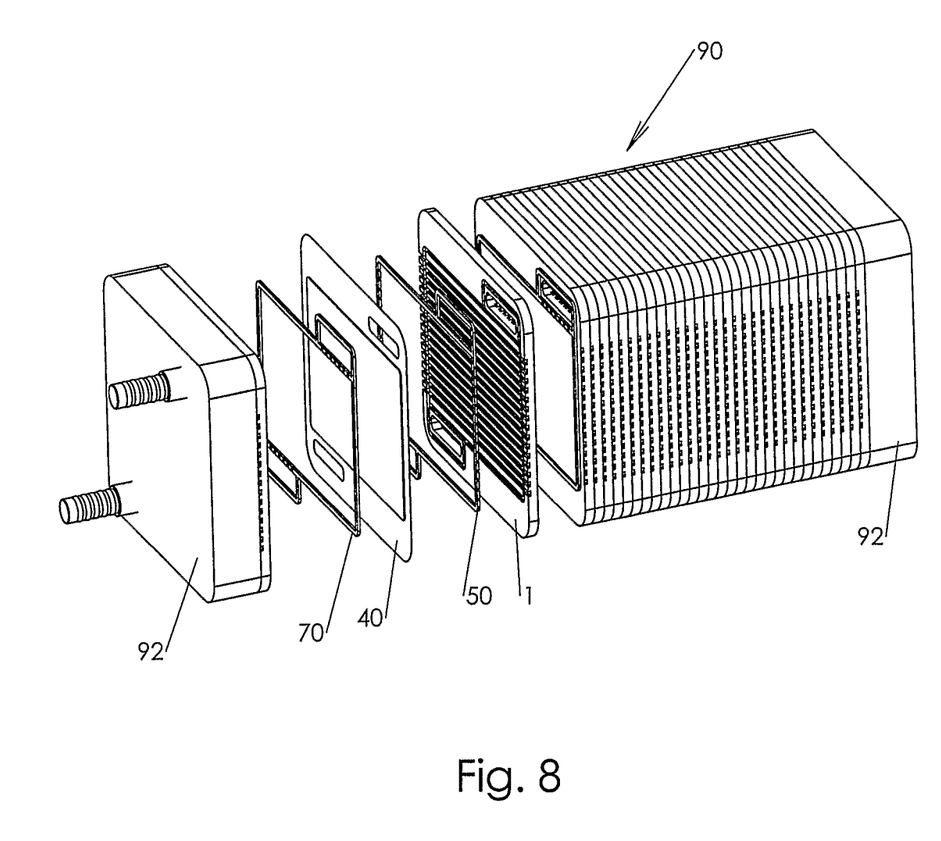
FIG. 8 is a perspective exploded view of a fuel sell stack assembly according to the present invention showing bipolar plates, membranes, sealants and endplates.

FIG. 8 shows in a perspective exploded view a fuel sell stack assembly 90 according to the present invention comprising bipolar plates 1, membranes 40, sealants 70 and 50 and endplates 92.

Figure 9:
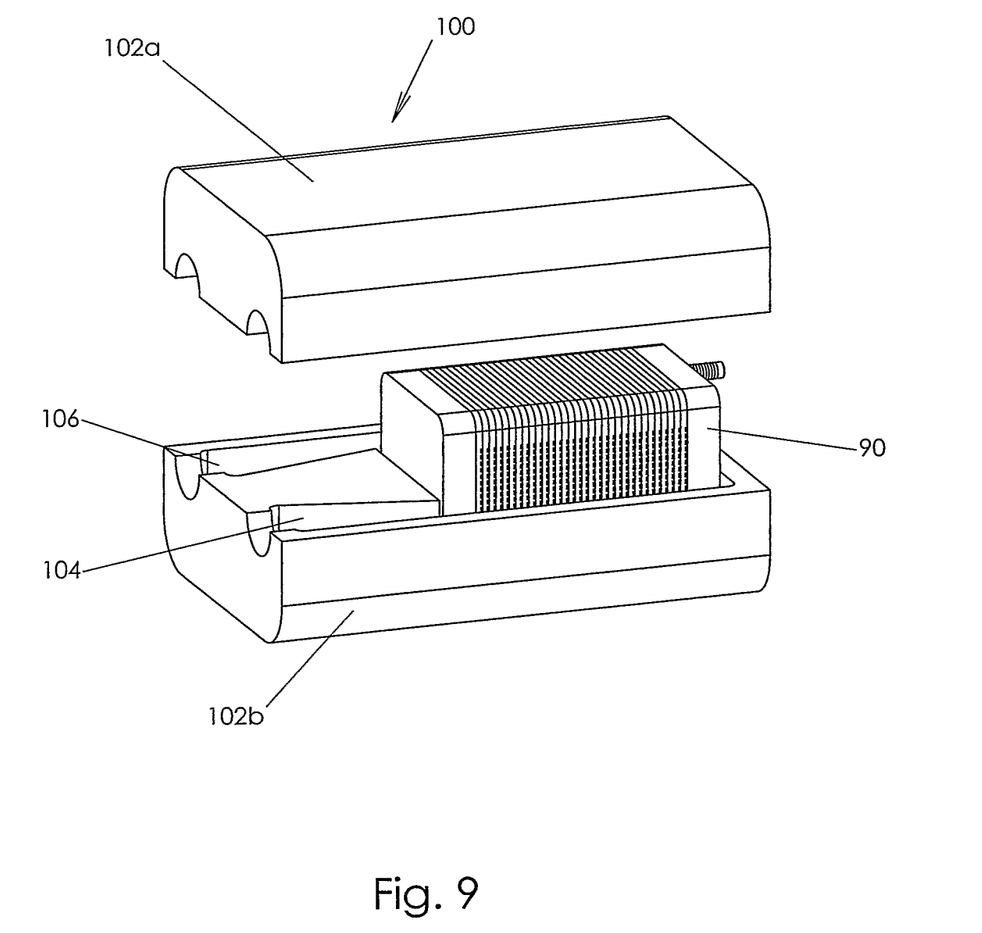
FIG. 9 is a perspective exploded view of a fuel cell stack system according to the present invention, wherein a fuel cell stack is enclosed in a container in a design that provides for two separate compartments that functions as a manifold for incoming oxygen/air and a manifold for exhausted oxygen/air and water vapour respectively.

A seventh aspect of the present invention relates to a PEM fuel cell stack system. The PEM fuel cell stack system comprises a PEM fuel cell stack 90, and said PEM fuel cell stack is enclosed in a container 102 in such a way that two separate rooms 104,106 are formed within said container, the first room 104 is located at the specific side of the fuel cell stack which comprises the edge sections 10*a* of each fuel cell comprising the inlet channels 6 for oxygen; the other room 106 is located on the specific side of the fuel cell stack which comprises the edge sections 10*b* of each fuel cell comprising the outlet channels 8 for oxygen. The separate rooms thereby define an inlet manifold for oxygen and an outlet manifold for oxygen. This allows for pumping oxygen/air into the separate room comprising the edge section 10*a* and thereby into the inlet channel grooves 6 and thus allows for securing a constant supply of oxygen to the active sites of the membrane facing the cathode side.

FIG. 9 is a perspective exploded view of a fuel cell stack system 100 according to the present invention, wherein a fuel cell stack 90 is enclosed in a container 102*a*,102*b* in a design that provides for two separate compartments 104,106 that functions as a manifold for incoming oxygen/air and a manifold for exhausted oxygen/air and water vapour respectively.

Uses of the PEM Fuel Cell Stack According to the Present Invention

In an eighth aspect, the present invention relates to a method for the production of electric power and/or heat using a PEM fuel cell stack according to the present invention or by use of a using a PEM fuel cell stack system according to the present invention.

In a ninth aspect, the present invention relates to use of a PEM fuel cell stack according to the present invention or use of a PEM fuel cell stack system according to the present invention as a back-up power system.

In a tenth aspect, the present invention relates to a use of PEM fuel cell stack according to the present invention or use of a PEM fuel cell stack system according to the present invention as continuous power generation system.

The invention claimed is:

1. A bipolar plate (1) in combination with a sealant (50, 70) for a PEM fuel cell, wherein the bipolar plate (1) has an anode side with first flow channels (20) for transport of a proton-donating fuel or a cathode side with second flow channels (12) for transport of proton-accepting fluid, or both, wherein the sealant (50, 70) is provided parallel with the bipolar plate (1) for sealing the bipolar plate against an adjacent electrolytic membrane (40), wherein the bipolar plate is provided with a groove (14*a*, 14*b*) for accommodating the sealant (50, 70), wherein the groove (14*a*, 14*b*) is along all edges of the bipolar plate (1), wherein the sealant (50, 70) is elastomeric and has first fluid channels (74*a*, 74*b*) and second fluid channels (54*a*, 54*b*) across the sealant (50, 70), wherein the first fluid channels (74*a*, 74*b*) have a different geometry than the second fluid channels (54*a*, 54*b*), wherein the sealant is a first sealant and a second sealant with the second sealant being separate from the first sealant, and wherein the first sealant (70) is separated from the second sealant (50) by the electrolytic membrane (40) between the sealants (50, 70);

a) wherein the first sealant (70) is provided only on the anode side and has first corrugations in the sealant providing first fluid channels (74*a*, 74*b*) and is connected to the first flow channels (20) of the anode side, wherein the first fluid channels (74*a*, 74*b*) transport proton-donating fluid across the sealant (57) and along the first flow channels (20) in the bipolar plate, and b) wherein the second sealant (50) is provided only on the cathode side and has second corrugations in the sealant providing second fluid channels (54*a*, 54*b*) and is connected to the second flow channels (12) of the cathode side, wherein the second fluid channels (54*a*, 54*b*) transport proton-accepting fluid across the sealant (50) and along the second flow channels (12) in the bipolar plate.

2. A combination according to claim 1, wherein the first flow channels (20) or the second channels (12) or both are surrounded by the sealant (50, 70).

3. A combination according to claim 1, said bipolar plate having a anode side and a cathode side; wherein a) said plate having a penetrating inlet hole (2) defining a flow channel for hydrogen gas entering the fuel cell; and said plate having a penetrating outlet hole (4) defining a flow channel for hydrogen gas exiting the fuel cell; and b1) said cathode side having one edge section (10*a*) comprising one or more grooves (6) defining inlet channels for oxidant gas; and said cathode side having another edge section (10*b*) comprising one or more grooves (8) defining outlet channels for oxidant gas; wherein the inlet channel grooves as well as the outlet channel grooves extend to the edge of the respective edge section; and wherein said cathode side having one or more grooves (12) defining flow channels for oxidant gas and connecting inlet channel(s) for oxidant gas with outlet channel(s) for oxidant gas; or b2) said anode side having an inlet channel for hydrogen gas in the form of one or more grooves (16) extending from the inside of the inlet hole (2); and said anode side having an outlet channel for hydrogen gas in the form of one or more grooves (18) extending from the inside of the outlet hole (4); and said anode side having one or more grooves (20) defining flow channels for hydrogen; said grooves (16, 20, 18) providing fluid connection of hydrogen gas from the inlet hole (2) for hydrogen gas to the outlet hole (4) for hydrogen gas; or both b1 and b2, and wherein c) either the anode side or the cathode side or both sides of the plate comprises: a sealant groove (14) for taking up a seal, said sealant groove extends alongside the edges of the plate (1) so as to be able to take up a sealant for efficiently avoiding escape of gas except via the channels intended therefore as defined above; said sealant groove (14*a*) if present on the cathode side intersects the inlet channel grooves (6) for oxidant gas as well as the outlet channel grooves (8) for oxidant gas; and said sealant groove (14*b*) if present on the anode side intersects the flow path of hydrogen entering via the inlet channel for hydrogen gas defined by grooves (16); and said sealant groove if present on the anode side intersects the flow path of hydrogen gas exiting via the outlet channel defined by grooves (18).

4. A combination according to claim 3 comprising feature a), feature b1), feature b2) and feature c).

5. A combination according to claim 3 comprising feature a), feature b1) and feature c) only in respect of the cathode side.

6. A combination according to claim 3 comprising feature a), feature b2) and feature c) only in respect of the anode side.

7. A combination according to claim 3, wherein the plate comprises feature b1; and wherein the number of grooves (6) defining the inlet channels for oxidant gas is: b2-20.

8. A combination according to claim 3, wherein the plate comprises feature b1; and wherein the number of grooves (8) defining the outlet channels for oxidant gas is: 2-30.

9. A combination according to claim 3, wherein the plate comprises feature b2; and wherein the number of grooves (16) providing passage from the inlet hole (2) for hydrogen to the grooves (20) is: 2-9.

10. A combination according to claim 3, wherein the plate comprises feature b2; and wherein the number of grooves (18) providing passage from the outlet hole (4) for hydrogen to the grooves (20) is: 2-9.

11. A combination according to claim 3 comprising the features a), b1), b2) and c), wherein feature c) comprises a sealant groove on the anode side as well as on the cathode side of the bipolar plate.

12. A combination according to claim 3, wherein the plate is made of a material selected from the group comprising: graphite; graphite powder comprising a binder; a metal; a metal comprising a corrosion resistant coating; an alloy; an alloy comprising a corrosion resistant coating; an electrically conducting elastomeric compound; and an electrically conducting ceramic material.

13. A combination according to claim 3 for sealing the cathode side of a bipolar plate, said bipolar plate comprising the features defined in b1, wherein said sealant is adapted to fit into the sealant groove (14a) of said cathode side of said bipolar plate; wherein said sealant in the part (52a,52b) adapted to fit into the part of the sealant groove which extends alongside the specific edge sections (10a,10b) comprising the inlet channel groove for oxidant gas and the outlet channel groove for oxidant gas respectively, comprises one or more cut-aways (54a,54b) for allowing oxidant gas to pass the sealant via the respective inlet and outlet channels for oxidant gas.

14. A combination according to claim 13, wherein the number of cutaways (54a,54b) in the sealant corresponds to the number of grooves (6) defining inlet channels for oxidant gas; and grooves (8) defining outlet channels for oxidant gas respectively.

15. A combination according to claim 3 for sealing the anode side of a bipolar plate, said bipolar plate comprising the features defined in b2, wherein said sealant is adapted to fit into the sealant groove (14b) of said anode side of said bipolar plate; wherein: said sealant in the part (72) adapted to fit into the sealant groove which intersects the flow path for hydrogen gas connecting the inlet channel grooves 16 and the grooves 20 comprises one or more cut-aways (74a) for allowing hydrogen gas to pass the sealant via said grooves defining the inlet channel for hydrogen gas; and wherein said sealant in the part (76) adapted to fit into the sealant groove which intersects the flow path for hydrogen gas connecting the outlet channel grooves 18 and the grooves comprises one or more cut-aways (74b) for allowing hydrogen gas to pass the sealant via said grooves defining the outlet channel for hydrogen gas.

16. A combination according to claim 15, wherein the number of cutaways (74a,74b) in the sealant corresponds to the number of grooves (16) defining inlet channels for hydrogen gas; and grooves (18) defining outlet channels for hydrogen respectively.

17. A combination according to claim 13, wherein the sealant is made of a material selected from the group comprising: elastomers, such as hydrocarbon rubbers, substituted hydrocarbon rubbers, such as fluoro-hydrocarbon rubbers; and silicon rubbers.

18. A combination according to claim 17, wherein the sealant material is highly corrosion resistant and/or is highly capable of withstanding penetration of hydrogen.

19. A PEM fuel cell stack (90) comprising more than one bipolar plate in a combination according to claim 3.

20. A PEM fuel cell stack system (100) comprising a fuel cell stack according to claim 19, wherein the PEM fuel cell stack is enclosed in a container (102) in such a way that two separate rooms (104,106) are formed within said container, the first room (104) is located at the specific side of the fuel cell stack which comprises the edge sections (10a) of each fuel cell comprising the inlet channels (6) for oxygen; the other room (106) is located on the specific side of the fuel cell stack which comprises the edge sections (10b) of each fuel cell comprising the outlet channels (8) for oxygen; said separate rooms thereby defining an inlet manifold for oxygen and an outlet manifold for oxygen.

21. A PEM fuel cell stack (90) comprising more than one bipolar plate and one or more sealants according to claim 13.

22. A method for the production of electric power and/or heat using a PEM fuel cell stack or a PEM fuel cell stack system according to claim 20.

* * * * *